United States Patent [19]

Adams

[11] 4,306,790
[45] Dec. 22, 1981

[54] CAMERA ATTACHMENT DEVICE
[75] Inventor: Neil D. Adams, St. Genevieve, Mo.
[73] Assignee: ADCO Products, Inc., Elk River, Minn.
[21] Appl. No.: 212,017
[22] Filed: Dec. 1, 1980
[51] Int. Cl.³ ............................................. G03B 29/00
[52] U.S. Cl. ...................................... 354/82; 354/293
[58] Field of Search ............................ 354/81, 82, 293

[56] References Cited
U.S. PATENT DOCUMENTS

| | | | |
|---|---|---|---|
| 2,753,778 | 7/1956 | Tolcher | 354/82 |
| 3,575,098 | 4/1971 | Jones | 354/293 |
| 3,877,048 | 4/1975 | Kellner | 354/82 |
| 4,177,967 | 12/1979 | Marchus | 354/82 |
| 4,187,021 | 2/1980 | Balser | 354/82 |

Primary Examiner—Russell E. Adams
Attorney, Agent, or Firm—Williamson, Bains, Moore & Hansen

[57] ABSTRACT

An attachment device is adapted to permit a camera to be positively supported in various positions on a hand-held camera support. The attachment device includes a positioning structure which is slidably engaged by an adapter member secured to a camera. The positioning structure is mounted on a mounting structure which is secured to a hand-held camera support. The positioning structure is adjustable relative to the mounting structure between a horizontal position and a plurality of angular positions. Cooperating locking means on the mounting and positioning structures positively lock the latter in one of the horizontal or angular positions.

5 Claims, 7 Drawing Figures

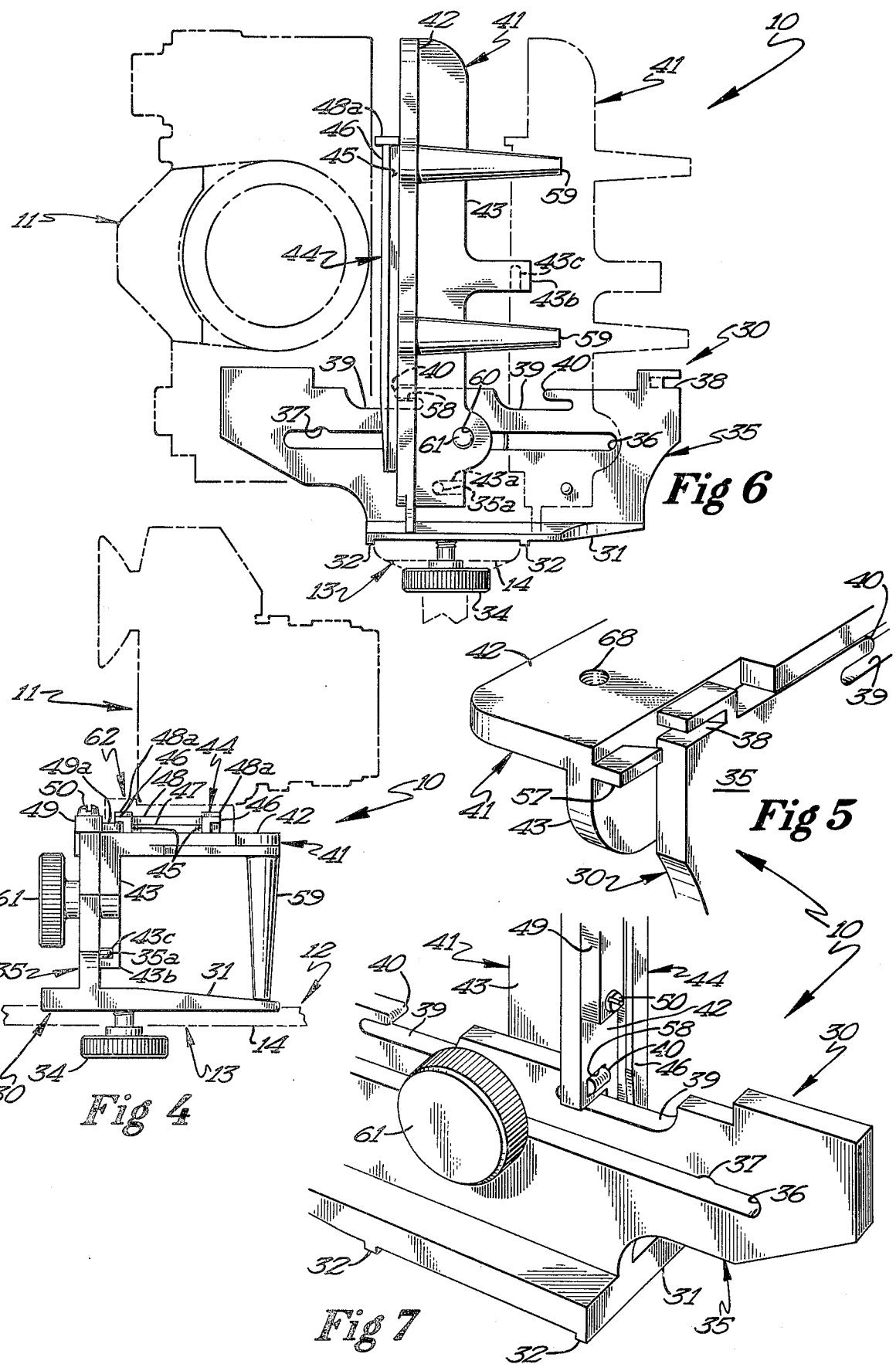

CAMERA ATTACHMENT DEVICE

SUMMARY OF THE INVENTION

This invention relates to an attachment device for a camera support and more particularly to an attachment device which permits a camera to be positively supported in various positions on a camera support.

An object of this invention is to provide a novel attachment device, of simple and inexpensive construction, which permits a camera to be positively supported in various positions on a camera support.

A more specific object of this invention is to provide an attachment device for a hand-held camera support including cooperating mounting and positioning members, one of which is connected with a camera support and the other being connected with a camera, the mounting and positioning members being adjustable relative to each other to permit the camera to be adjusted to a plurality of various positions with respect to the camera support.

These and other objects and advantages of this invention will more fully appear from the following description made in connection with the accompanying drawings, wherein like reference characters refer to the same or similar parts throughout the several views.

FIGURES OF THE DRAWINGS

FIG. 4 is an elevational view taken approximately along line 4—4 of FIG. 1 and looking in the direction of the arrows;

FIG. 5 is a fragmentary perspective view of a portion of the attachment device illustrating certain parts thereof in an unlocked position;

FIG. 6 is an elevational view of the attachment device illustrated in one position in full-line configuration and illustrated in another position in dotted line configuration; and FIG. 7 is a fragmentary perspective view of certain components of the attachment device.

DESCRIPTION OF THE PREFERRED EMBODIMENT OF THE INVENTION

Figure 1:
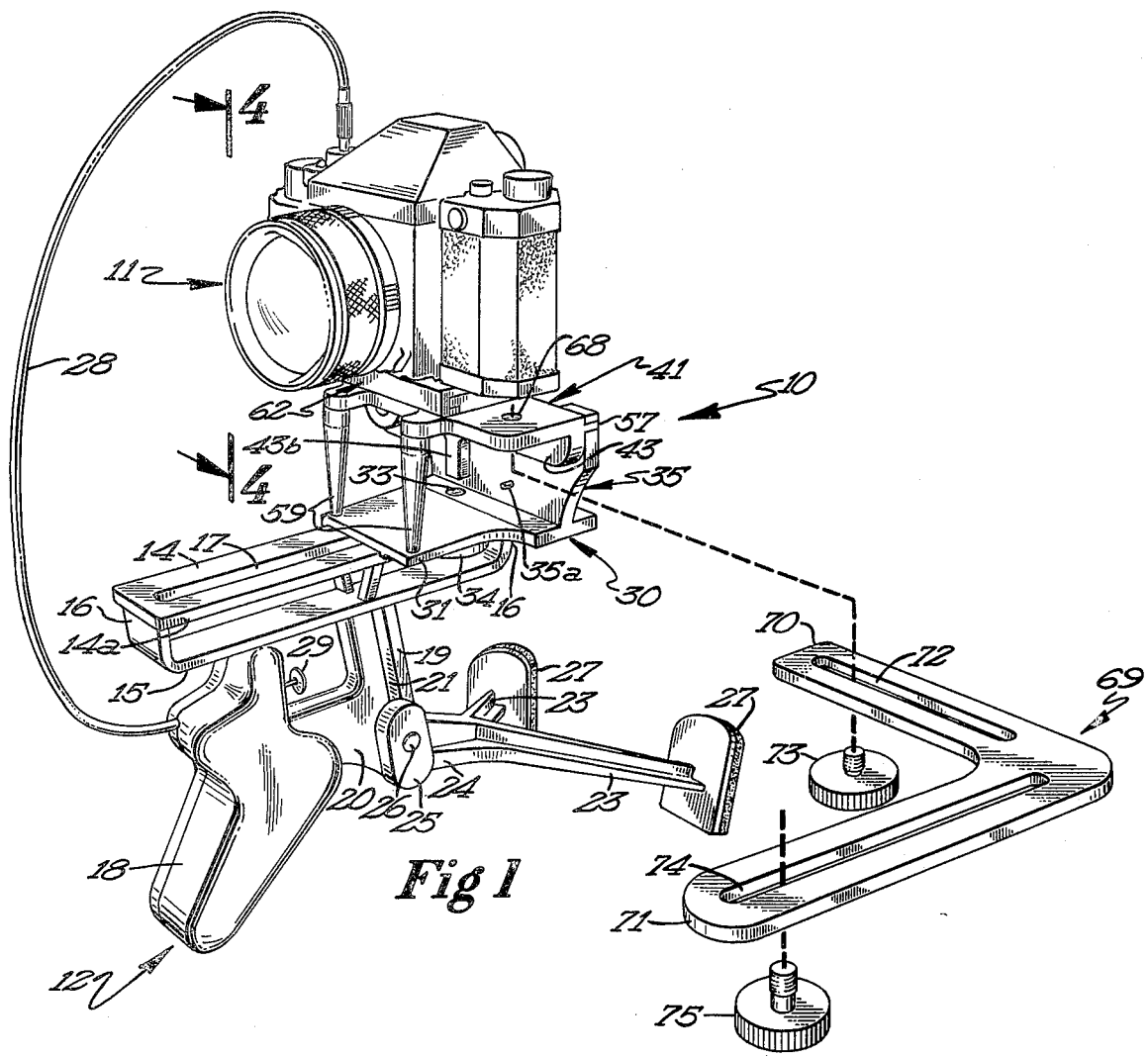
FIG. 1 is a perspective view of the attachment device connected with a camera support and supporting a camera thereon with certain parts thereof exploded for clarity.
Figure 3:
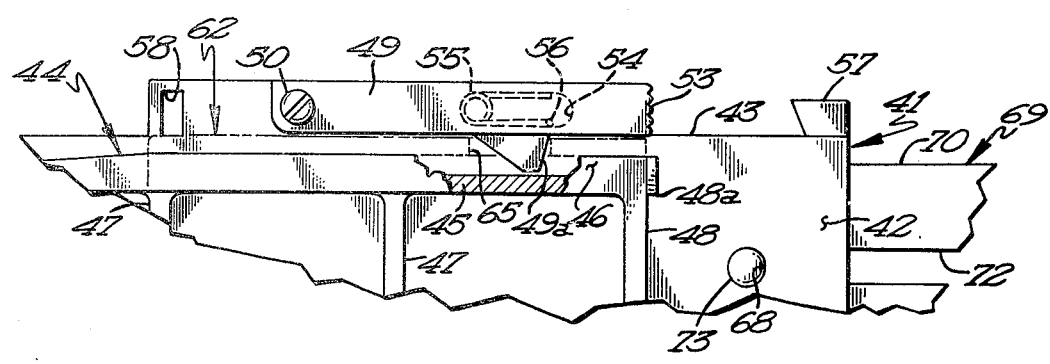
FIG. 3 is a top plan view taken approximately along line 3—3 of FIG. 2 and looking in the direction of the arrows.

Referring now to FIG. 1, it will be seen that one embodiment of my novel attachment device, designated generally by the reference numeral 10, is illustrated in attached relation with a camera 11 and a hand-held camera support 12. The camera support 12 includes a platform 13 comprised of a flat, generally rectangular, vertically spaced-apart, upper and lower platform elements 14 and 15, respectively, which are interconnected by end elements 16. It will be noted that the upper platform element 14 is provided with an elongate, longitudinally extending centrally located slot 17 therein.

The camera support also includes a hand grip member 18 which is affixed to the lower surface of the lower platform element 15. A vertically depending standard 19 is also integral with the lower surface of the lower platform element 15 and is provided with a forwardly projecting element 20 which is secured to the hand grip member 18. The vertically disposed standard 19 also has an elongate vertically extending slot 21 therein.

The camera support 12 also includes a leg structure 22 comprised of a pair of legs 23 which diverge from a common attachment portion 24. An attachment tab 25 having a threaded aperture 26 therein is integral with the attachment portion 24 and the threaded aperture thereof is threadedly engaged by an adapter bolt (not shown) to secure the leg structure to the standard 19. In this regard, the adapter bolt projects through the slot 21 in the standard 19 and permits the leg structure to be vertically adjusted relative to the platform 13.

The free ends of the diverging legs 23 are provided with cushion elements 27 which are adapted to engage the chest of a user when the user grasps the hand grip member 18. The camera support 12 is also provided with a conventional cable release 28 connected to the camera 11 for operating the latter, the cable release 28 projecting through the hand grip member 18 and provided with an actuator button 29.

Figure 2:
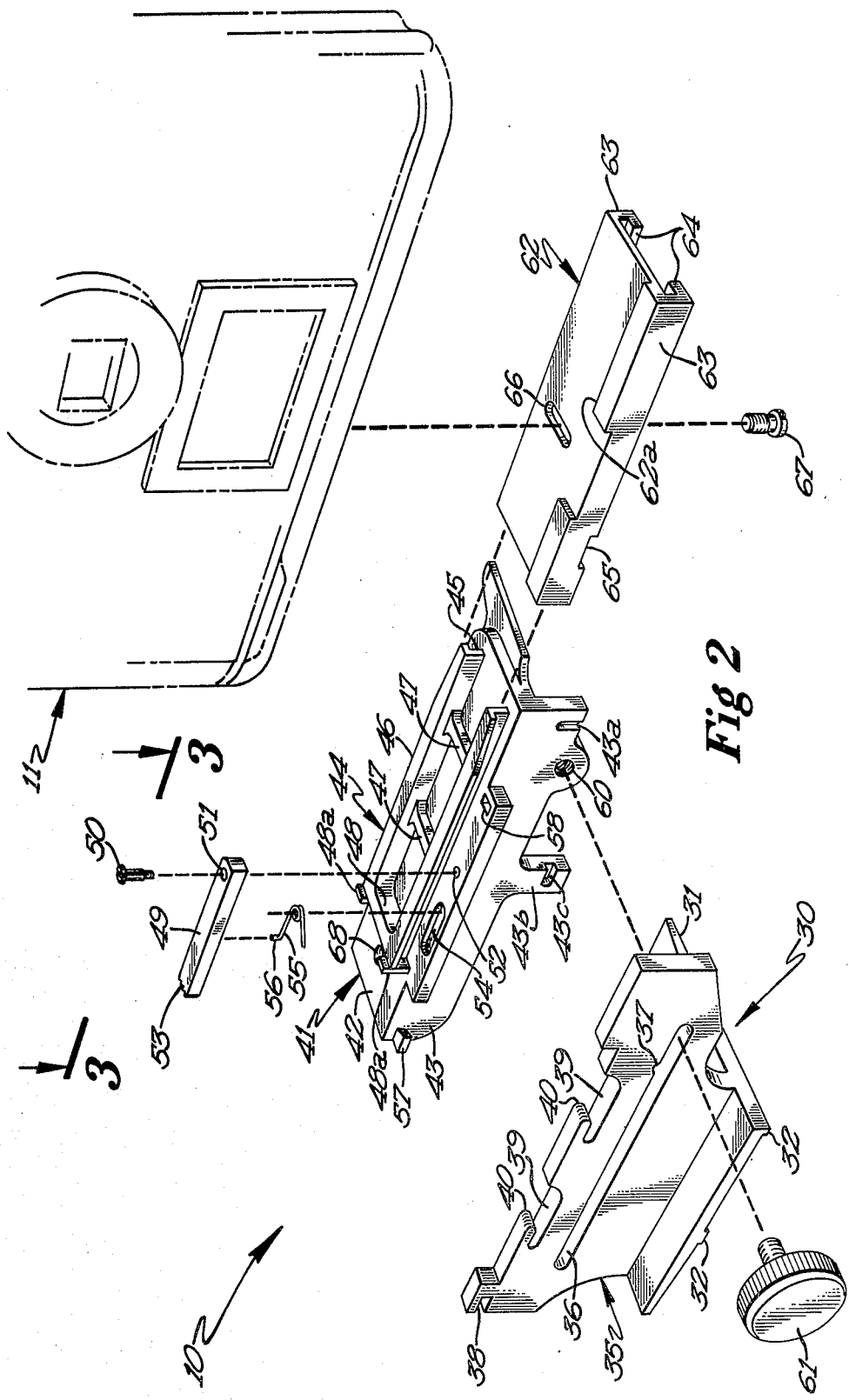
FIG. 2 is an exploded, perspective view of the various components of the attachment device.

The attachment device 10 includes a mounting structure 30 comprised of a substantially flat, base plate 31 as best seen in FIG. 2. The base plate 31 has an elongate substantially straight guide element 32 integral with the lower surface thereof which is adapted to engage one longitudinal edge 14a of the upper platform element 14. The base plate 31 is also provided with a threaded aperture 33 therein which is threadedly engaged by an adapter bolt 34 which projects through slot 17 in the upper platform element to secure the mounting structure to the camera support, as best seen in FIG. 1.

The mounting structure 30 also includes a locking member 35 which comprises a substantially flat plate affixed at its lower edge to the base plate 31 and projecting upwardly therefrom. In the embodiment shown, the locking member 35 is positioned adjacent one transverse edge of the base plate 31 but is spaced rearwardly of this edge. The locking member is provided with an elongate slot 36 therein which extends throughout the major portion of the transverse dimension of the locking member. An arcuate notch 37 is formed in the slot 36 intermediate the ends thereof. Referring now to FIGS. 4 and 6, it will be seen that a pair of spaced apart pins 35a are affixed to the locking member and project forwardly therefrom.

The locking member 35 is also provided with an outwardly opening recess or notch 38 therein adjacent one longitudinal edge thereof and is provided with a pair of spaced-apart similar recesses 39 in the upper edge thereof. The recesses 39 define a pair of laterally projecting generally horizontally oriented locking tabs or elements 40.

Referring again to FIG. 2, it will be seen that the attachment device 10 also includes a positioning structure 41 which is comprised of a substantially horizontally disposed flat support member 42 and a substantially generally flat, vertically disposed locking member 43 affixed to the support member and depending angularly from one transverse edge thereof. The support member 42 has a guide member 44 affixed to the upper surface thereof which is comprised of a pair of elongate, spaced-apart transversely extending guide elements 45. Each of the guide elements 45 is provided with an outwardly projecting flange 46 to define an angle-type guide structure. Each of the guide elements 45 is also interconnected by intermediate connecting elements 47 and an end element 48 as best seen in FIG. 2. Suitable vertical disposed stop elements 48a are affixed to the end elements and project upwardly therefrom.

The support member 42 is also provided with an elongate generally rectangular shaped latching element 49 which is pivotally connected to the upper surface thereof by a pivot bolt 50. It will be noted that the latch element 49 is positioned adjacent the rear transverse edge of the support member. It sill also be noted that the pivot bolt 50 projects through an aperture 51 in one end of the latch element 49 and threadedly engages a threaded aperture 52 in the upper surface of the support member. The outer or free end of the latch element 49 is provided with serrations 53 to facilitate pivoting thereof by a user. The upper surface of the support member 42 is provided with a recess 54 therein which received a spring 55, the latter having one end thereof offset to engage a recess or opening in the latch element to normally urge the latch element 49 towards the adjacent guide element 45. In this regard, the latch element 49 is provided with a detent element 49a which projects laterally therefrom and towards the adjacent guide element 45.

Referring now to FIGS. 2 and 5, it will be seen that the support member 42 is provided with an outwardly projecting element 57 which is affixed to the rear edge adjacent one end thereof. The locking element 57 is horizontally oriented and is adapted to engage the locking recess 38 when the positioning structure 41 is locked in horizontal relation with respect to the mounting structure 30. The support member 42 also has an opening 58 therethrough adjacent the rear transverse edge thereof.

Referring now to FIG. 1, it will be seen that the support member 42 is provided with a pair of transversely spaced-apart, elongate post elements 59 which engage the base plate 31 of the mounting structure 30 when the positioning structure 41 is in one of its adjusted positions.

The locking member 43 is provided with a threaded aperture 60 which is threadedly engaged by an adapter bolt 61, the latter projecting through the slot 36 in the locking member 35 for securing the positioning structure 41 to the mounting structure 30. The locking member 43 is also provided with a vertically extending downwardly opening recess 43a therein which is spaced from but positioned adjacent the threaded recess 60. The recess 43a is adapted to engage one of the locking pins 35a on the locking member 35. The locking member 43 is also provided with a downwardly projecting arm 43b intermediate the respective edges thereof, the arm 43b being provided with a horizontally extending recess 43c therein. It will be seen that the recess 43c is also adapted to that pin 35a on the locking member 35 located at the left in FIG. 6 when the positioning structure is in the horizontal position.

Referring again to FIG. 2, it will be seen that the attachment device 10 also includes an adapter member 62 which is of generally flat rectangular configuration and which has flanges 63 depending from the transverse edges thereof. The flanges 63 terminate downwardly in inturned flanges 64 that project towards each other. It will be seen that the adapter member 62 is provided with a raised, rear transverse edge portion 62a which functions as a stop when the camera 11 is mounted thereon. In this regard, the adapter member 62 is provided with an aperture 66 in the general central portion thereof which receives an adapter bolt 67 therethrough.

The adapter bolt 67 is adapted to threadedly engage the conventional threaded aperture in a camera housing for the camera 11 to secure the camera to the adapter member 62. The adapter member can then be moved into sliding engagement with the guide elements 45 so that the inturned flanges 64 underly the horizontal flanges 46 on the guide elements. A locking recess 65 in the rear flange 63 of the adapter member 62 is engaged by the latch detent 49a of the latch element 49 to secure the aperture member in mounted relation on the support member 42.

Referring now to FIG. 1, it will be seen that the attachment device is also provided with an angle bracket 69 which is adapted to support a flash attachment or the like. The angle bracket 69 includes a leg 70 which is integral with and disposed in substantially right angular relation with respect to a leg 71. The leg 70 is provided with an elongate slot 72 therein through which projects an adapter bolt 73. The adapter bolt 73 is adapted to threadedly engage threaded aperture 68 in the support member 42. The leg 71 is also provided with a slot 74 therethrough for accommodating adapter bolt 75. Adapter bolt 75 is adapted to threadedly engage a flash bulb attachment to support the same in proximal relation to the camera 11.

In use, the base plate 31 of the mounting structure 30 will be secured to the platform 13 by means of the adapter bolt 34. In this regard, the base plate may be positioned longitudinally at any selected position along the platform 67. The adapter bolt 61 will secure the positioning structure 41 to the mounting structure 30 and the adapter member 62 will be secured to the camera 11 by the adapter bolt 67. The adapter member with the camera 11 secured thereto will then be moved into slidable engagement with the guide member 44 until the detent 49a of latch element 49 engages in the recess 65 to lock the adapter member on the positioning structure. It will be appreciated that the edge of the adapter member 62 will engage the stop elements 48a on the end element 48.

The camera will then be positioned as shown in FIG. 1 whereby the support member 42 will be horizontally oriented. In this position, the recess 43c on the arm 43b of the locking member 43 will engage the pin 35a on the left, as viewed in FIG. 6. The user will grip the hand grip member 18 of the camera support with one hand and the legs 23 of the camera support will be positioned against the user's chest to provide a steady support and convenient positioning of the camera 11. The camera can be operated by the actuator button of the cable release 28.

In the event that it is desirable to position the camera 11 in an angulated position with respect to the camera support 12, the user will loosen the adapter bolt 61 and will shift the positioning structure 41 forwardly until the locking element 57 is moved completely out of engagement with the locking notch 58. When this occurs, the notch or recess 43c in the arm 43b will be disengaged from the associated locking pin 35a on the locking member 35. The positioning structure may then be pivoted about the locking bolt 31 in the slot 36 so that the positioning member is vertically oriented relative to the mounting structure 30, as best seen in FIG. 6. The positioning member may be moved relative to the mounting structure until one of the locking tabs 40 on the locking member 35 projects through the aperture 58 in the support member 42. When this occurs, the locking notch 43a on the locking member 43 will engage one of the locking pins 35a on the locking member 35. The adapter bolt 61 will then be tightened to lock the positioning structure in its adjusted position. It will therefore be seen that the positioning structure 41 may be disposed in horizontal position with respect to the mounting structure as illustrated in FIG. 1 or may be releasably locked in one of two vertical or angulated positions as illustrated in FIG. 6. This adjustment of the position of the camera relative to the camera support 12 may be readily accomplished but it will be seen that the camera will be positively and effectively locked in its adjusted position by the cooperating locking elements on the mounting and positioning structures.

With this arrangement, it will be seen that the user can effectively and comfortably support a camera on the camera support while simultaneously disposing the camera in the most effective position for use.

Thus, it will be seen that I have provided a novel attachment device, of simple and inexpensive construction, for adjustably mounting a camera on a camera support in a more efficient manner than any heretofore known attachment device.

It is anticipated that various changes can be made in the size, shape and construction of the attachment device disclosed herein without departing from the scope of the invention as defined by the following claims.

What is claimed is:

1. An attachment device for a camera support having a platform, a hand grip secured to said platform and depending therefrom, a leg structure including a pair of diverging legs joined at one end and connected with said platform, said legs adapted to engage the chest of a user, said attachment device including,
   a mounting structure, means securing the mounting structure on the platform to permit adjustment of the mounting structure along the surface of the platform,
   a positioning structure, means adjustably securing said positioning structure to said mounting structure, said positioning structure being adjustable between a horizontal position and a plurality of angular positions relative to said mounting structure, said last mentioned securing means including cooperating locking members on said mounting and positioning structures interengaging each other to releasably lock the positioning structure in one of said horizontal or angular positions,
   an adapter member adapted to be attached to a camera and engaging said positioning structure,
   and cooperating latch means on said positioning structure and adapter member for releasably latching the latter on the positioning structure.

2. The attachment device as defined in claim 1 wherein said positioning structure is disposed in substantially parallel relation with the platform of said camera support when the positioning structure is in the horizontal position.

3. The attachment device as defined in claim 1 wherein one of said locking members has an elongate, slot therein, and the other of said locking members has a bolt secured thereto projecting through said slot to permit adjustment of said structures relative to each other.

4. The attachment device as defined in claim 3 wherein said bolt and slot defines a movable pivot connection between said structures.

5. The attachment device as defined in claim 1 and cooperating guide means on said adapter member and positioning structure for permitting the adapter member to slidably engage the positioning structure.

* * * * *